United States Patent
Taylor et al.

(10) Patent No.: US 9,541,302 B2
(45) Date of Patent: Jan. 10, 2017

(54) FLAT PANEL CONTACTORS AND METHODS

(75) Inventors: Gareth P. Taylor, Indian Trail, NC (US); Timothy D. Price, Monroe, NC (US); Amitava Sengupta, Charlotte, NC (US); Paul A. Peterson, Clover, SC (US); C. Glen Wensley, Rock Hill, SC (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/485,966

(22) Filed: Jun. 1, 2012

(65) Prior Publication Data

US 2012/0304862 A1 Dec. 6, 2012

Related U.S. Application Data (60) Provisional application No. 61/492,839, filed on Jun. 3, 2011.

(51) Int. Cl.
*B01D 53/22* (2006.01)
*F24F 13/28* (2006.01)
(Continued)

(52) U.S. Cl.
CPC ........... *F24F 13/28* (2013.01); *B01D 46/2411* (2013.01); *B01D 53/268* (2013.01); *B01D 63/02* (2013.01);
(Continued)

(58) Field of Classification Search
CPC ....... B01D 53/22; B01D 63/02; B01D 53/268; B01D 61/36; B01D 2053/22; B01D 2257/804; B01D 46/2411; B01D 46/54; B01D 2257/2045; B01D 2257/302; B01D 2257/404; B01D 2257/406; B01D 2258/06; B01D 2257/504; B01D 2257/80; B01D 2258/0266; B01D 2053/224; F24F 2003/1435; F24F 13/28
(Continued)

(56) References Cited

U.S. PATENT DOCUMENTS 2,774,680 A * 12/1956 Darkis ................. A24D 3/0212
118/309
4,257,791 A * 3/1981 Wald .................... B01D 39/083
55/291
(Continued)

FOREIGN PATENT DOCUMENTS

CN     101450284     6/2009
CN     101698136     4/2010
(Continued)

OTHER PUBLICATIONS

Machine Translation DONG CN101450284A, Jun. 10, 2009, 10 pgs.*
Membrana "Liqui-Cel Membrane Contactors" 2008, 2 pages. <http://www.quantumflowtech.com/docs/4x28-D60Rev9-03-061. pdf>.*

*Primary Examiner* — Anthony Shumate
(74) *Attorney, Agent, or Firm* — Hammer & Associates, P.C.

(57) ABSTRACT

Porous membrane contactors and/or their methods of manufacture and/or use are provided. In at least selected embodiments, the present invention is directed to flat panel hollow fiber or flat sheet membrane contactors and/or their methods of manufacture and/or use. In at least certain particular embodiments, the present invention is directed to hollow fiber array flat panel contactors, contactor systems, and/or their methods of manufacture and/or use. In at least particular possibly preferred embodiments, the contactor is adapted for placement in an air duct (such as an HVAC ductwork) and has a rectangular frame or housing enclosing at least one wound hollow fiber array or membrane bundle.

4 Claims, 5 Drawing Sheets

(51) Int. Cl.
  *B01D 53/26* (2006.01)
  *B01D 63/02* (2006.01)
  *B01D 46/24* (2006.01)
  B01D 46/52 (2006.01)
  B01D 46/54 (2006.01)

(52) U.S. Cl.
  CPC ............. *B01D 46/52* (2013.01); *B01D 46/54* (2013.01); *B01D 2053/224* (2013.01); *B01D 2257/2045* (2013.01); *B01D 2257/302* (2013.01); *B01D 2257/404* (2013.01); *B01D 2257/406* (2013.01); *B01D 2257/504* (2013.01); *B01D 2257/80* (2013.01); *B01D 2258/0266* (2013.01); *B01D 2258/06* (2013.01)

(58) Field of Classification Search
  USPC .................................. 95/45, 52; 96/7, 8, 10
  See application file for complete search history.

(56) References Cited

U.S. PATENT DOCUMENTS

| | | | | |
|---|---|---|---|---|
| 4,324,231 | A * | 4/1982 | Reinert | F24J 2/0444 126/633 |
| 4,900,488 | A * | 2/1990 | Collins et al. | 264/45.7 |
| 4,915,838 | A * | 4/1990 | Bonne | B01D 53/268 210/321.8 |
| 5,102,745 | A * | 4/1992 | Tatarchuk | B22F 3/002 428/605 |
| 5,141,031 | A * | 8/1992 | Baurmeister | B01D 63/02 139/383 R |
| 5,174,900 | A * | 12/1992 | Nichols | B01D 63/02 210/321.79 |
| 5,225,161 | A * | 7/1993 | Mathewson | A61M 1/1698 128/DIG. 3 |
| 5,282,964 | A * | 2/1994 | Young et al. | 210/321.8 |
| 5,352,361 | A * | 10/1994 | Prasad et al. | 210/321.81 |
| 5,368,786 | A * | 11/1994 | Dinauer | B01D 53/268 128/203.12 |
| 5,403,383 | A * | 4/1995 | Jaisinghani | B03C 3/66 422/22 |
| 5,429,184 | A * | 7/1995 | Bach | A61M 1/1698 165/149 |
| 5,449,457 | A * | 9/1995 | Prasad | B01D 53/22 210/321.8 |
| 5,695,702 | A * | 12/1997 | Niermeyer | 264/129 |
| 5,779,897 | A * | 7/1998 | Kalthod | B01D 53/22 210/321.8 |
| 5,976,220 | A * | 11/1999 | Braun | B01D 46/005 55/385.2 |
| 6,361,588 | B1 * | 3/2002 | Moratalla | B01D 53/22 55/521 |
| 7,387,730 | B2 | 6/2008 | Nakahara et al. | |
| 7,393,390 | B2 * | 7/2008 | Matsunaga | 96/10 |
| 7,749,381 | B2 * | 7/2010 | Nakahara et al. | 210/321.79 |
| 7,758,671 | B2 * | 7/2010 | Kesten et al. | 95/46 |
| 7,922,902 | B2 * | 4/2011 | Watari et al. | 210/257.2 |
| 8,388,733 | B2 * | 3/2013 | Yamaoka et al. | 95/50 |
| 8,425,656 | B2 * | 4/2013 | Ciora et al. | 95/45 |
| 2003/0192820 | A1 * | 10/2003 | Cho | B01D 19/0031 210/321.83 |
| 2003/0196552 | A1 * | 10/2003 | Willey | B03C 3/16 96/44 |
| 2003/0200973 | A1 * | 10/2003 | Xue | A24D 3/163 131/202 |
| 2004/0099140 | A1 * | 5/2004 | Hesse | B01D 53/268 96/8 |
| 2004/0211726 | A1 * | 10/2004 | Baig | B01D 53/22 210/640 |
| 2004/0229343 | A1 * | 11/2004 | Husain | B01D 63/02 435/262 |
| 2006/0037896 | A1 * | 2/2006 | Cote | B01D 63/02 210/150 |
| 2006/0090651 | A1 * | 5/2006 | Liu | B01D 46/0021 96/121 |
| 2006/0249020 | A1 * | 11/2006 | Tonkovich | B01D 53/04 95/115 |
| 2007/0246049 | A1 * | 10/2007 | Takeda | A61M 16/16 128/205.27 |
| 2008/0164203 | A1 * | 7/2008 | Nakahara et al. | 210/483 |
| 2009/0032475 | A1 * | 2/2009 | Ferrer | B01D 17/10 210/799 |
| 2009/0193974 | A1 * | 8/2009 | Montie et al. | 96/8 |
| 2009/0226784 | A1 * | 9/2009 | Kim | B01D 63/02 429/413 |
| 2011/0272354 | A1 * | 11/2011 | Mitra | B01D 61/02 210/640 |
| 2012/0079944 | A1 * | 4/2012 | Vo | B01D 67/0067 96/11 |
| 2012/0247337 | A1 * | 10/2012 | Taylor | B01D 19/0031 96/6 |
| 2012/0264026 | A1 * | 10/2012 | Brenner | B01D 63/08 429/413 |
| 2013/0186121 | A1 * | 7/2013 | Erb | F24F 3/1417 62/238.1 |
| 2014/0073718 | A1 * | 3/2014 | Carpenter | C09D 133/00 523/310 |
| 2014/0264967 | A1 * | 9/2014 | Kandil | B01D 53/229 261/95 |
| 2014/0309471 | A1 * | 10/2014 | Zhou | C07C 7/005 585/802 |
| 2014/0331622 | A1 * | 11/2014 | Gruenbacher | B01D 46/42 55/361 |
| 2015/0190747 | A1 * | 7/2015 | Ahn | B01D 53/1475 95/46 |
| 2015/0298070 | A1 * | 10/2015 | Koslov | B01D 69/06 210/651 |

FOREIGN PATENT DOCUMENTS

| | | | |
|---|---|---|---|
| JP | H10-197016 | 7/1998 | |
| WO | WO9304223 A1 * | 3/1993 | ............ D01D 5/247 |
| WO | WO 2009044711 A1 * | 4/2009 | |

* cited by examiner

FLAT PANEL CONTACTORS AND METHODS

CROSS-REFERENCE TO RELATED APPLICATIONS

The present application claims the benefit of and priority to U.S. provisional patent application Ser. No. 61/492,839, filed Jun. 3, 2011, which is hereby incorporated by reference herein.

FIELD OF INVENTION

The instant application relates to flat panel porous membrane contactors and/or their methods of manufacture and/or use. In at least selected embodiments, the present invention is directed to flat panel microporous membrane contactors and/or their methods of manufacture and/or use. In at least certain particular embodiments, the present invention is directed to flat sheet and/or hollow fiber array flat panel contactors, contactor systems, and/or their methods of manufacture and/or use. In at least selected embodiments, the present invention is directed to hollow fiber membrane contactors and/or their methods of manufacture and/or use. In at least certain selected embodiments, the present invention is directed to flat panel hollow fiber membrane contactors and/or their methods of manufacture and/or use. In at least certain particular embodiments, the present invention is directed to hollow fiber array flat panel contactors, contactor systems, and/or their methods of manufacture and/or use. In at least particular selected embodiments, the contactor is adapted for placement in an air duct (such as an HVAC duct) and has a rectangular frame or housing enclosing at least one wound, pleated or folded flat sheet and/hollow fiber array, potting affixing each end of the wound, pleated or folded flat sheet and/hollow fiber array, and adapted to have a first fluid in communication with the open ends of the wound, pleated or folded flat sheet and/or hollow fibers and a second fluid in communication with the exterior surface of the wound, pleated or folded flat sheet and/or shells of the hollow fibers. In at least particular possibly preferred embodiments, the contactor is adapted for placement in an air duct (such as an HVAC duct) and has a rectangular frame or housing enclosing at least one wound, pleated or folded hollow fiber array including a plurality of hollow fiber membranes, potting affixing each end of the hollow fibers, and adapted to have a first fluid in communication with the open ends of the hollow fibers and a second fluid in communication with the shells of the hollow fibers.

BACKGROUND OF THE INVENTION

A membrane contactor may be used for many purposes, including but not limited to, removing entrained gases from liquids, debubbling liquids, filtering liquids, and adding a gas to a liquid. Membrane contactors are known to be used in many different applications, for example, a membrane contactor may be used in removing entrained gases from inks used in printing.

Membrane contactors may also provide a means of accomplishing gas/gas, gas/liquid, and liquid/liquid (which can encompass liquid/dissolved solid) separations, transfers or additions. Membrane contactors typically are used to bring two immiscible fluid phases—for example, a first liquid and a second liquid, or a gas and a liquid—into contact with one another to effect separation and/or transfer of one or more components from one fluid to the other.

A hollow fiber membrane contactor typically includes a cylindrical bundle or mat of microporous hollow fibers, and a rigid cylindrical shell or housing enclosing the fiber bundle. The shell may be provided with multiple ports, for example, four fluid ports: an inlet for introducing the first fluid, an outlet for discharging the first fluid, an inlet for introducing the second fluid, and an outlet for discharging the second fluid. The hollow fibers may be potted on both ends, within the housing, to form polymeric tube sheets with the fiber bores opening on each end into common first and second end cap portions of the shell. In a "tube-side" or "lumen-side" contactor, the first end cap may contain the inlet for the first fluid, which is designated the "tube-side" or "lumen-side" fluid because it is the fluid that passes through the internal lumens of the fibers. The second end cap contains the outlet for discharging the lumen-side fluid. The second fluid, designated the "shell-side" fluid, typically enters and exits the housing through inlet and outlet ports arranged between the tube sheets, whereby the shell-side fluid contacts the external surfaces of the fibers. The shell-side fluid flows through the interstices between fibers of the fiber bundle, and may be directed to flow parallel or perpendicular to the fiber length.

In a "shell-side" contactor, the contactor may include a central core which passes through the end caps and has a first end serving as the inlet for the first fluid, which is designated the "shell-side" fluid because it is the fluid that passes over the exterior or shell of the hollow fibers. The first end cap may contain the inlet for the second fluid, which is designated the "tube-side" or "lumen-side" fluid because it is the fluid that passes through the internal lumens of the fibers. The second end cap contains the outlet for discharging the lumen-side fluid. The first fluid, designated the "shell-side" fluid, typically enters and exits the housing through inlet and outlet ports (open ends) of the perforated core, and typically exits and re-enters the perforations in the core between the tube sheets whereby the shell-side fluid contacts the external surfaces of the fibers. The shell-side fluid flows through the interstices between fibers of the fiber bundle, and may be directed to flow parallel or perpendicular to the fiber length.

Because the tube sheets separate the lumen-side fluid from the shell-side fluid, the lumen-side fluid does not mix with the shell-side fluid, and the only transfer between the lumen-side fluid and the shell-side fluid occurs through the walls of the hollow fibers. The fine pores in the fiber wall are normally filled with a stationary layer of one of the two fluids, the other fluid being excluded from the pores due to surface tension and/or pressure differential effects. Mass transfer and separation are usually caused by diffusion, which is driven by the difference in concentration of the transferring species between the two phases. Typically, no convective or bulk flow occurs across the membrane.

In the case of gas/liquid separations, membrane contactors are typically fabricated with hydrophobic hollow fiber microporous membranes. Since the membranes are hydrophobic and have very small pores, liquid will not easily pass through the pores. The membranes act as an inert support that brings the liquid and gas phases into direct contact, without dispersion. The mass transfer between the two phases is typically governed by the difference in partial pressure of the gas species being transferred.

For liquid systems, the liquid/liquid interface at each pore is typically immobilized by the appropriate selection of membrane and liquid phase pressures. In this case, the membrane also acts as an inert support to facilitate direct contacting of two immiscible phases without mixing.

Such known mainly cylindrically shaped membrane contactors can be utilized for a variety of applications, including the separation of a component from a fluid or transferring a component of one fluid to another. For example, a membrane contactor can be used in removal of contaminants from an effluent stream. In many industrial processes, a contaminated effluent stream is generated as a by-product. In view of environmental concerns, the desire to separate components, the need to protect equipment, and/or efforts to improve process efficiency, it is often necessary or desirable to, for example, remove one or more components or contaminants from the effluent stream so that the component or contaminant does not pollute the environment, negatively effect equipment, or so that it may be recycled. Existing industrial processes frequently must be upgraded to reduce environmental emissions and/or increase efficiency. Therefore, a need often arises for a process and system that can be economically retrofit to an existing plant to reduce emissions, protect equipment, recycle, or improve efficiency.

At least certain existing membrane contactors have been found less than fully satisfactory in particular applications, for certain conditions, or the like. For example, most shell-type contactors typically must operate at elevated pressures. Accordingly, a need exists for an improved hollow fiber membrane contactor having improved design or characteristics over known membrane contactors, for use in particular applications, for use in certain conditions, and/or the like. It is to the provision of a porous hollow fiber membrane device and/or method meeting these and/or other needs that at least selected embodiments of the present invention may be directed.

The use of porous materials for the selective passage of gases and blockage of liquids is known. For example, LIQUI-CEL® hollow fiber membrane contactors, sold by Membrana-Charlotte a division of Celgard, LLC of Charlotte, N.C., are used for degassing or debubbling liquids. More particularly, LIQUI-CEL® membrane contactors are used extensively for deaeration of liquids in the microelectronics, pharmaceutical, power, food, beverage, industrial, photographic, ink, and analytical markets around the world.

The use of porous materials for the selective passage of humidity (moisture vapor) and blockage of liquid water, liquid desiccant, or other aqueous solutions may be known. In such liquid-desiccant systems, temperature and humidity may be controlled by a salt solution (or desiccant) which absorbs or emits water vapor.

The use of porous materials for the selective passage of water vapor (heat and moisture) and the blockage of gasses (exhaust and intake gases) may be known in connection with energy recovery ventilation (ERV) wherein heat and humidity are exchanged between make-up and exhaust air in a ventilation system.

The use of a membrane with a gas permeable separation layer such as PMP or silicone is known for selective gas/gas and gas/liquid exchange. Such applications can be used to separate selective gasses such as water vapor from an air stream.

While possibly certain such porous materials for the selective passage of gases or humidity (moisture vapor) and blockage of liquid water or salt water may have met with commercial success, such as RO membranes sold by Dow Chemical, or expanded polytetrafluoroethylene (ePTFE) membranes sold by W. L. Gore, BHA, and others, there is a need for improved porous materials so that they may be used in a wider spectrum of applications, may perform better for particular purposes, under certain conditions, or the like. Also, a need exists for an improved membrane contactor having improved design or characteristics over known membrane contactors, for use in particular applications, for use in certain conditions, and/or the like. It is to the provision of a porous membrane device and/or method meeting these and/or other needs that at least certain selected embodiments of the present invention may be directed.

SUMMARY OF THE INVENTION

In at least selected embodiments, the present invention is directed to flat panel porous membrane contactors and/or their methods of manufacture and/or use. Such flat panel porous membrane contactors and/or their methods of manufacture and/or use may address one or more of the above described needs or drawbacks. In at least selected embodiments, the present invention is directed to flat panel microporous membrane contactors and/or their methods of manufacture and/or use. In at least certain particular embodiments, the present invention is directed to flat sheet and/or hollow fiber array flat panel contactors, contactor systems, and/or their methods of manufacture and/or use. In at least selected embodiments, the present invention is directed to hollow fiber membrane contactors and/or their methods of manufacture and/or use. In at least certain selected embodiments, the present invention is directed to flat panel hollow fiber membrane contactors and/or their methods of manufacture and/or use. In at least certain particular embodiments, the present invention is directed to hollow fiber array flat panel contactors, contactor systems, and/or their methods of manufacture and/or use. In at least particular selected embodiments, the contactor is adapted for placement in an air duct (such as an HVAC duct) and has a rectangular frame or housing enclosing at least one wound, pleated or folded flat sheet and/hollow fiber array, potting affixing each end of the wound, pleated or folded flat sheet and/hollow fiber array, and adapted to have a first fluid in communication with the open ends of the wound, pleated or folded flat sheet and/or hollow fibers and a second fluid in communication with the exterior surface of the wound, pleated or folded flat sheet and/or shells of the hollow fibers. In at least particular possibly preferred embodiments, the contactor is adapted for placement in an air duct (such as an HVAC duct) and has a rectangular frame or housing enclosing at least one wound, pleated or folded hollow fiber array including a plurality of hollow fiber membranes, potting affixing each end of the hollow fibers, and adapted to have a first fluid in communication with the open ends of the hollow fibers and a second fluid in communication with the shells of the hollow fibers.

In at least selected embodiments, the present invention is directed to hollow fiber membrane contactors and/or their methods of manufacture and/or use. In at least certain selected embodiments, the present invention is directed to flat panel hollow fiber membrane contactors and/or their methods of manufacture and/or use. In at least certain particular embodiments, the present invention is directed to hollow fiber array flat panel contactors, contactor systems, and/or their methods of manufacture and/or use.

In at least particular possibly preferred embodiments, a rectangular flat panel contactor is adapted for placement in an air duct (such as an HVAC duct) and has a rectangular frame or housing enclosing at least one wound (for example, elongated oval or rectangle) or pleated or folded (for example, accordion folded) hollow fiber array including a plurality of porous hollow fiber membranes, potting affixing each end of the hollow fibers, large shell side fluid openings in communication with the shells of the hollow fibers, and lumen side fluid head spaces in communication with the open ends and lumens of the hollow fibers. The number of windings or layers of hollow fiber array or fabric determines the depth of the panel. The end result is a hollow fiber array with X height, Y width, and Z depth. The hollow fiber array may be potted directly into a square or rectangular frame, similar in shape to an HVAC air filter. In at least one embodiment, air to be treated would pass through the contactor array on the shell side (outside of the hollow fibers) in a cross flow pattern with liquid (hot, cold, humidifying, or absorbent liquid) passing through the lumen side (interior of the hollow fibers) of the contactor array.

In at least selected embodiments, the present invention is directed to an improved device for heating, cooling, humidifying, and/or dehumidifying air passing through or being treated by a liquid-desiccant, an HVAC and/or an ERV system. In at least one embodiment, hot humid air to be treated would pass through the panel contactor array on the shell side (outside of the hollow fibers) in a cross flow pattern with liquid (cold and/or absorbent liquid, a salt solution, or desiccant) passing through the lumen side of the panel contactor array. In at least one other embodiment, cold dry air to be treated would pass through the panel contactor array on the shell side (outside of the hollow fibers) in a cross flow pattern with liquid (hot and/or humidifying liquid, a salt solution, or desiccant) passing through the lumen side of the panel contactor array. In at least one other embodiment, humid air to be treated would pass through the panel contactor array on the shell side in a cross flow pattern. A membrane with a separation layer preferably selective to water vapor over air (nitrogen, CO2, and oxygen) may be used. A vacuum may be applied to the lumen side of the membrane to create a driving force to draw the water vapor into the lumen side of the membrane.

In at least certain embodiments, the present invention is directed to methods of producing or manufacturing flat panel hollow fiber array contactors. In at least one embodiment, the panel contactor is produced by a method including winding a hollow fiber membrane array around a paddle to form a square or rectangular format fiber bundle. The number of windings or layers determines the depth or thickness of the panel. The end result is a fiber array with X height, Y width, and Z depth. Then, the wound array is removed from the paddle and potted directly into a square or rectangular frame, similar in shape to an HVAC air filter. If needed, the ends of the hollow fibers are opened and lumen side fluid head spaces are formed or added at each end. Such a panel contactor is adapted to have air pass through the array on the shell side (outside of hollow fibers) in a cross flow pattern with liquid (hot, cold, humidifying, and/or absorbent liquid) passing through or vacuum applied to the lumen side (interior of the hollow fibers) of the contactor array.

In at least one other embodiment, the panel contactor is produced by a method including pleating or folding (for example, z folded, accordion folded, or pleated, and then optionally wound) a hollow fiber membrane array to form a square or rectangular format fiber bundle. The number of folds or layers may determine the depth of the panel. The end result is a fiber array with X height, Y width, and Z depth. Then, the folded or pleated array is potted directly into a square or rectangular frame, similar in shape to an HVAC air filter. If needed, the ends of the hollow fibers are opened and lumen side fluid head spaces are formed or added at each end. Such a panel contactor is adapted to have air pass through the array on the shell side (outside of hollow fibers) in a cross flow pattern with liquid (hot, cold, humidifying, and/or absorbent liquid) passing through or vacuum applied to the lumen side (interior of the hollow fibers) of the contactor array.

In at least certain embodiments, the present invention is directed to methods of using or uses of flat panel hollow fiber array contactors. In at least one embodiment, the panel contactor is used by a method including passing air to be treated through the contactor array on the shell side (outside of the hollow fibers) in a cross flow pattern at the same time that liquid (hot, cold, humidifying, and/or absorbent liquid) is passing through the lumen side (interior of the hollow fibers) of the contactor array. As such, the contactor is a lumen-side liquid contactor.

In at least one other embodiment, the panel contactor is used by or in a method including passing liquid to be treated through the contactor array on the shell side (outside of the hollow fibers) in a cross flow pattern at the same time that a second liquid or gas is passing through the lumen side (interior of the hollow fibers) of the contactor array. As such, the contactor is a shell-side liquid contactor.

In at least one other embodiment, the panel contactor is used by or in a method including passing air to be treated through the contactor array on the shell side (outside of the hollow fibers) in a cross flow pattern at the same time a vacuum or sweep gas is passing through the lumen side (interior of the hollow fibers) of the contactor array. As such, the contactor is a shell-side gas/gas contactor.

Other uses of the inventive panel contactor may include:
$CO_2$ scrubbing,
Greenhouse gas scrubbing,
$SO_x$ scrubbing,
$NO_x$ scrubbing,
HCL scrubbing,
Ammonia scrubbing,
Humidification of gas,
Dehumidification of gas,
Liquid desiccant absorption of moisture and latent heat for energy recovery in HVAC systems,
Air emission control (of noxious odors—such as at pig or hog farms), and/or
Gas temperature control by varying the humidity level (such as in evaporative cooling or in a swamp cooler).

In accordance with at least selected embodiments of the present invention, the present new or improved hollow fiber membrane contactors address the drawbacks of prior contactors, are effective for some applications, are especially adapted for certain conditions, fit in standard HVAC duct work, may have immediate customer familiarity and acceptance, do not use metal or other corrosive materials, do not use PVC, are modular, are replaceable, have standard air filter sizes, accommodate high air flow rates, have low shell-side pressure drop, allow for commercial production, and/or the like.

In accordance with at least certain embodiments of the present invention, a new or improved hollow fiber membrane flat panel contactor allows for rectangular, modular, fluid treatment contactors to be used in air handling, liquid-desiccant systems, temperature and humidity control systems, ERV, HVAC, and/or the like. Accordingly, at least certain embodiments of the present invention provide a new or improved hollow fiber membrane contactor which addresses the need for a new or improved membrane contactor and/or methods of manufacture and/or use thereof.

In at least one embodiment, a self contained hollow fiber membrane contactor, filter or cartridge may include at least a first hollow fiber array including a plurality of at least first hollow fiber membranes each having a first end and a second end both being open, at least one rectangular frame, shell, casing or housing, and potting at each end. The first and second membrane ends are open, for example, to allow liquid to pass there through. It may be preferred that the hollow fibers be polyolefin, the frame be ABS, the potting be made of epoxy, and that the ends of the potting be cut off to form the open first and second hollow fiber ends following potting.

In accordance with at least selected embodiments, a combination or system of flat panel contactors includes two or more hollow fiber membrane panel contactors connected in series or in parallel. According to at least particular possibly preferred embodiments, the combination or system of flat panel contactors includes two or more hollow fiber membrane panel contactors connected in series with the frames of adjacent contactors abutting and aligned with one another (an optional gasket can be placed between abutting frames and/or between the end frames and duct work to provide an air tight seal there between).

In accordance with at least particular embodiments, the preferred flat panel contactor frame or housing has standard air, furnace, AC, ERV, MERV, or HVAC filter outer dimensions (for example, 20"×20"×1", 20"×20"×2", 20"×20"×4", 20"×20"×5", 20"×25"×1", 20"×25"×2", 20"×25"×4", 20"×25"×5", or the like).

Further, the present membrane contactors may offer a modular option for many applications and they can be put in virtually any area of a building, in any duct work, in any AC, ERV or HVAC system, and/or the like. They may rapidly displace other air treatment filters or devices.

The present membrane contactors preferably use commercially available materials (for example, ABS housing, ABS ports, polypropylene hollow fibers, epoxy potting material, and the like). The possibly preferred high performance Celgard® X40 and X50 microporous hydrophobic polypropylene hollow fibers are durable and very cost effective.

Such preferred devices may be clean enough to be used in a semiconductor plant. They may also provide ERV or HVAC operating costs. The preferred size, shape, materials, product design, use, and/or replacement may allow for more favorable economics of the preferred device for many large industrial applications. If purity and FDA compliance are important in the end use application, high-purity membrane contactor embodiments are contemplated for those end uses.

In accordance with at least selected possibly preferred embodiments, the present panel membrane contactors (or membrane cartridges) preferably utilize thousands of Celgard® microporous polyolefin (PO) hollow fibers, such as hydrophobic polypropylene (PP) or polymethyl pentene (PMP, or poly(4-methyl-1-pentene)) hollow fibers knitted into an array that is, for example, wound around a paddle or similar form, pleated, folded, and/or combinations thereof. During preferred operation, the air to be treated flows over the shell side or shellside (outside) of the hollow fibers, while the liquid desiccant flows through or in the lumen side or lumenside (inside) of the hollow fibers. Because of its hydrophobic nature, the membrane acts as an inert support to allow direct contact between a gas and liquid phase without dispersion.

In accordance with certain embodiments of the invention, there are provided a novel contactor, contactor system, method, and/or the like for treating one fluid with another fluid.

In accordance with at least another embodiment of the invention, a contactor system includes a source of liquid, a source of air or gas, and at least one flat panel contactor including a plurality of microporous hollow fibers, and a rectangular frame, shell, housing, or vessel. The source of liquid is preferably in fluid communication with the lumens of the hollow fibers. The air or gas preferably passes over or across the fibers and through the contactor.

In accordance with at least one object of the invention, there are provided new or improved hollow fiber membrane fabric-containing flat panel contactors.

It is another object of at least selected embodiments of this invention to provide methods of manufacture and/or use of such panel contactors.

It is an additional object of at least certain embodiments of this invention to provide methods for constructing improved contactors and/or contactor systems.

In accordance with at least one object of at least selected embodiments of the invention, there are provided new or improved porous flat sheet membrane contactors.

It is another object of at least selected embodiments of this invention to provide methods of manufacture and/or use of such flat sheet contactors.

In accordance with at least one object of the invention, there are provided new or improved porous membrane flat panel contactors.

It is another object of at least selected embodiments of this invention to provide methods of manufacture and/or use of such flat panel contactors.

It is an additional object of at least certain embodiments of this invention to provide methods for constructing new or improved flat panel contactors and/or contactor systems.

Further objects may be set forth in the discussion below.

Further embodiments and/or the various embodiments may be described or detailed in the discussion below and defined in the appended claims.

BRIEF DESCRIPTION OF THE DRAWINGS

For the purpose of illustrating the embodiments or aspects of the invention, there is shown in the drawings a form that is presently possibly preferred; it being understood, however, that the present invention is not limited to the precise embodiments, aspects, arrangements, and/or instrumentalities shown.

DETAILED DESCRIPTION OF THE INVENTION

In at least selected embodiments, the present invention is directed to hollow fiber membrane contactors and/or their methods of manufacture and/or use.

Preferably, the panel contactor has a rectangular frame or housing enclosing at least one hollow fiber array including a plurality of hollow fiber membranes, and potting or a rectangular sheet affixing each end of said hollow fibers. Preferably, the hollow fiber lumens (interior or lumen side) are in fluid communication with a first fluid (a liquid, gas, sweep gas, a vacuum, or combinations thereof), and the hollow fiber shells (exterior or shell side) are in fluid communication with a second fluid (a liquid, gas, sweep gas, air, forced air, or combinations thereof). In one embodiment, the first fluid is a liquid desiccant and the second fluid is air to be treated.

Although a rectangular frame is preferred, other shapes are contemplated.

A membrane contactor has a shell side and a lumen side. It is possible to run liquid on shell side and gas on lumen side, or vice versa. However, from pressure-drop considerations it is generally preferred to have the gas flow through the shell side (lower pressure drop) for humidification applications. The humidity of the gas leaving the membrane contactor depends on many factors. Primary process parameters are liquid and gas temperatures, liquid and gas flow rates, membrane area, and gas pressure. In general, as gas flow rate increases the effluent gas humidity decreases. Providing additional membrane area will increase humidity.

In at least selected embodiments, the present invention is directed to hollow fiber membrane contactors and/or their methods of manufacture and/or use. In at least selected embodiments, the present invention is directed to flat panel hollow fiber membrane contactors and/or their methods of manufacture and/or use. In at least certain particular embodiments, the present invention is directed to hollow fiber array flat panel contactors, contactor systems, and/or their methods of manufacture and/or use.

In at least particular possibly preferred embodiments, a rectangular flat panel contactor is adapted for placement in an air duct, ventilation air duct, return (return air grille), vent, diffuser, filter housing, or air handling equipment (such as an HVAC (Heating, Ventilation, and Air Conditioning), HVACR or HVAC&R (Heating, Ventilation, Air Conditioning, and Refrigeration), HACR (Heating, Air Conditioning, and Refrigeration), ERV (Energy Recovery Ventilation), AC (Air Conditioning), Refrigeration, air handler, forced ventilation, and/or the like ductwork) and has a rectangular frame or housing enclosing at least one wound (for example, elongated oval or rectangle) or pleated or folded (for example, z folded or accordion folded) hollow fiber array including a plurality of hollow fiber membranes, potting affixing each end of the hollow fibers, large shell side fluid openings in communication with the shells of the hollow fibers, and lumen side fluid head spaces in communication with the open ends and lumens of the hollow fibers. The number of windings or layers of hollow fiber array or fabric determines the depth or thickness of the panel. The end result is a hollow fiber array with X height, Y width, and Z depth. The hollow fiber array may be potted directly into a square or rectangular frame, similar in shape to an HVAC air filter. In at least one embodiment, air to be treated passes through the contactor array on the shell side (outside of the hollow fibers) in a cross flow pattern with liquid (hot, cold, humidifying, or absorbent liquid) passing through the lumen side of the contactor array.

In at least selected embodiments, the present invention is directed to an improved device for heating, cooling, humidifying, and/or dehumidifying air passing through or being treated by a liquid-desiccant, an HVAC and/or an ERV system. In at least one embodiment, hot humid air to be treated would pass through the panel contactor array on the shell side (outside of the hollow fibers) in a cross flow pattern with liquid (cold and/or absorbent liquid, a salt solution, or desiccant) passing through the lumen side of the panel contactor array. In at least one other embodiment, cold dry air to be treated would pass through the panel contactor array on the shell side (outside of the hollow fibers) in a cross flow pattern with liquid (hot and/or humidifying liquid, a salt solution, or desiccant) passing through the lumen side of the panel contactor array.

In at least certain embodiments, the present invention is directed to methods of producing or manufacturing flat panel hollow fiber array contactors. In at least one embodiment, the panel contactor is produced by a method including winding a hollow fiber membrane array around a paddle to form a square or rectangular format fiber bundle. The number of windings or layers determines the depth of the panel. The end result is a fiber array with X height, Y width, and Z depth. Then, the wound array is removed from the paddle and potted directly into a square or rectangular frame, similar in shape to an HVAC air filter. If needed, the ends of the hollow fibers are opened and lumen side fluid head spaces (and ports) are formed or added at each end. Such a panel contactor is preferably adapted to have air pass through the array on the shell side (outside of hollow fibers) in a cross flow pattern with liquid (hot, cold, humidifying, and/or absorbent liquid) passing through the lumen side (interior of the hollow fibers) of the contactor array.

In at least one other embodiment, the panel contactor is produced by a method including pleating or folding (z folded, hollow elongated oval, hollow rectangle, or accordion folded) a hollow fiber membrane array to form a square or rectangular format fiber bundle. The number of folds or layers may determine the depth of the panel. The end result is a fiber array with X height, Y width, and Z depth. Then, the folded or pleated array is potted directly into a square or rectangular frame, similar in shape to an HVAC air filter. If needed, the ends of the hollow fibers are opened and lumen side fluid head spaces (and ports) are formed or added at each end. Such a panel contactor is adapted to have air pass through the array on the shell side (outside of hollow fibers) in a cross flow pattern with liquid (hot, cold, humidifying, and/or absorbent liquid) passing through the lumen side (interior of the hollow fibers) of the contactor array.

In at least certain embodiments, the present invention is directed to methods of using or uses of flat panel hollow fiber array contactors. In at least one embodiment, the panel contactor is used by a method including passing air to be treated through the contactor array on the shell side (outside of the hollow fibers) in a cross flow pattern at the same time that liquid (hot, cold, humidifying, and/or absorbent liquid) is passing through the lumen side (interior of the hollow fibers) of the contactor array. As such, the contactor is a lumen-side liquid contactor.

In at least one other embodiment, the panel contactor is used by a method including passing liquid to be treated through the contactor array on the shell side (outside of the hollow fibers) in a cross flow pattern at the same time that a second liquid or gas is passing through the lumen side (interior of the hollow fibers) of the contactor array. As such, the contactor is a shell-side liquid contactor.

Other uses of the panel contactor may include without limitation:
$CO_2$ scrubbing,
Greenhouse gas scrubbing,
$SO_x$ scrubbing,
$NO_x$ scrubbing,
HCL scrubbing,
Ammonia scrubbing,
Humidification of gas,
Dehumidification of gas—such as
  liquid desiccant absorption of moisture and latent heat for energy recovery in HVAC systems, Air emission control (of noxious odors—such as at pig or hog farms), and/or Gas temperature control by varying the humidity level (such as in an evaporative or swamp cooler).

In at least one embodiment, the present invention preferably involves the use of novel or commercially available hollow fiber membrane array or fabric that is wound around a paddle or accordion folded to form a square or rectangular format. The number of windings or layers determines the depth of the panel. The end result is a fiber array with X height, Y width, and Z depth. The array would be potted directly into a square or rectangular frame, similar in shape to an HVAC air filter. Preferably, air would pass through the array on the shell side (outside of hollow fiber) in a cross flow pattern with liquid (hot, cold, humidifying, or absorbent liquid) passing through the lumen side.

In accordance with at least certain embodiments or aspects of the present invention, unique features may include without limitation:

A design that appears to be mass-producible for a cost effective product,

Integrally potted (liquid-on-liquid, gravity, solvent based polymers or centrifugal) into frame that would be placed directly into a standard air handling ductwork, Cartridge-type frame allows for easy removal and replacement, Top and bottom liquid header design using extruded polymer elements, Chemically resistant construction (preferably non-metallic), Paddle-wound or accordion folded, continuous hollow fiber array, By varying the Warp fiber spacing and array winding tension, the fibers could be self-cleaning since due to the movement/vibration of the hollow fibers during the movement of air through the fiber array (air flow on OD of fibers), The density of the fiber spacing (from about 10 fpi (fibers per inch) to 58 fpi) can be used to alter air pressure drop, which is flowed through the fiber array, The surface area can be adjusted by the fiber array depth or array fiber per inch to adjust contactor efficiency, Liquid can be gravity flowed or pumped through lumen side, The high amount of hollow fiber surface per sq ft of duct area would make an efficient scrubber or other mass/energy transfer device, No liquid entrainment in gas stream (in contrast, traditional methods spray water or chemicals in the gas stream followed by demisters), Can use different fibers for selective removal, Can be staged for more efficient units operations, and/or Preferred gas pressure drop across the array is less than 0.5 psi per 1000 SCFM (Standard cubic feet per minute).

In accordance with at least particular embodiments, the preferred flat panel contactor frame or housing has standard air, furnace, AC, ERV, MERV, or HVAC filter outer dimensions (for example, 20"×20"×1", 20"×20"×2", 20"×20"×4", 20"×20"×5", 20"×25"×1", 20"×25"×2", 20"×25"×4", 20"×25"×5", or the like).

In accordance with at least particular embodiments, the preferred flat panel contactor frame or housing has standard air, furnace, AC, ERV, MERV, or HVAC filter outer dimensions (for example, listed in inches:

1 inch thick:
10×20×1, 11½×11½×1, 12×12×1, 12×18×1, 12×20×1, 12×24×1, 14×20×1, 14×24×1, 14×25×1, 14×30×1, 15×20×1, 16×16×1, 16×20×1, 16×24×1, 16×25×1, 18×18×1, 18×20×1, 18×24×1, 18×25×1, 20×20×1, 20×24×1, 20×25×1, 20×30×1, 24×24×1, 24×30×1, 25×25×1

2 inch thick:
10×20×2, 12×20×2, 12×24×2, 14×20×2, 14×24×2, 14×25×2, 15×20×2, 16×16×2, 16×20×2, 16×24×2, 16×25×2, 18×18×2, 18×20×2, 18×24×2, 18×25×2, 20×20×2, 20×24×2, 20×25×2, 20×30×2, 24×24×2, 24×30×2, 25×25×2

4 inch thick:
12×24×4, 16×20×4, 16×24×4, 18×24×4, 20×20×4, 20×24×4, 20×25×4, 24×24×4

5 inch thick:
16×25×5, 20×20×5, 20×25×5

In accordance with at least selected embodiments of the present invention, an improved flat panel contactor or module includes at least one rectangular frame or housing and at least one hollow fiber array therein. It may be preferred that the housing be made of, for example, ABS, polypropylene, polycarbonate, stainless steel, and/or other corrosion resistant materials.

Figure 1:
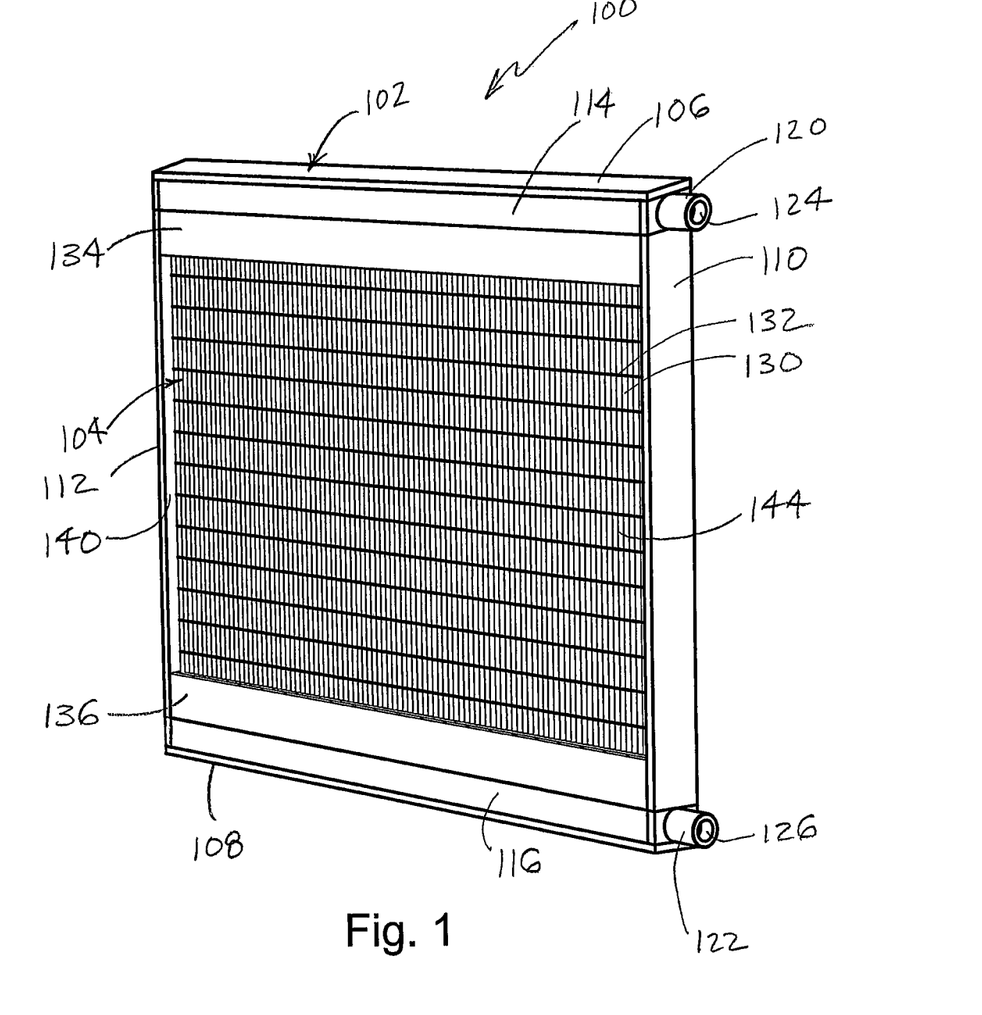
FIG. 1 is a perspective front view illustration of an exemplary flat panel contactor of at least one embodiment of the instant invention.
Figure 2:
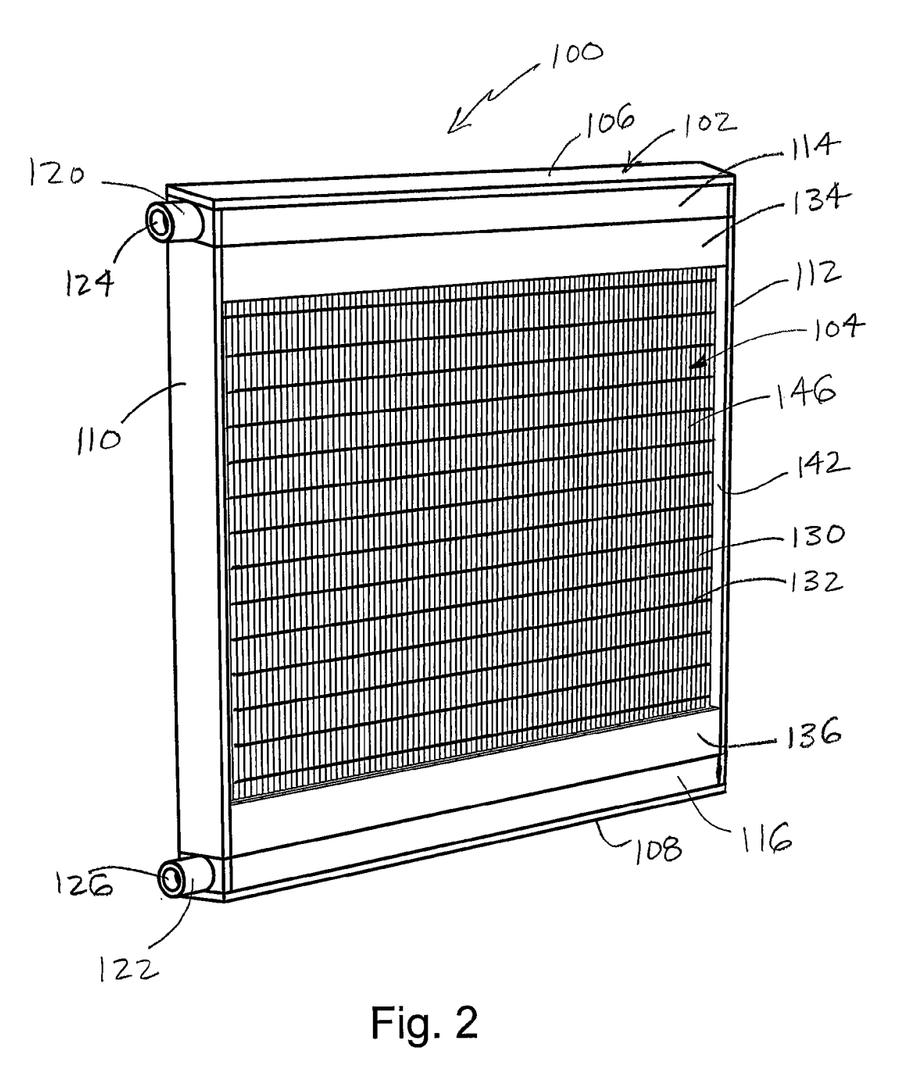
FIG. 2 is a perspective rear view illustration of the exemplary flat panel contactor of FIG. 1.
Figure 3:
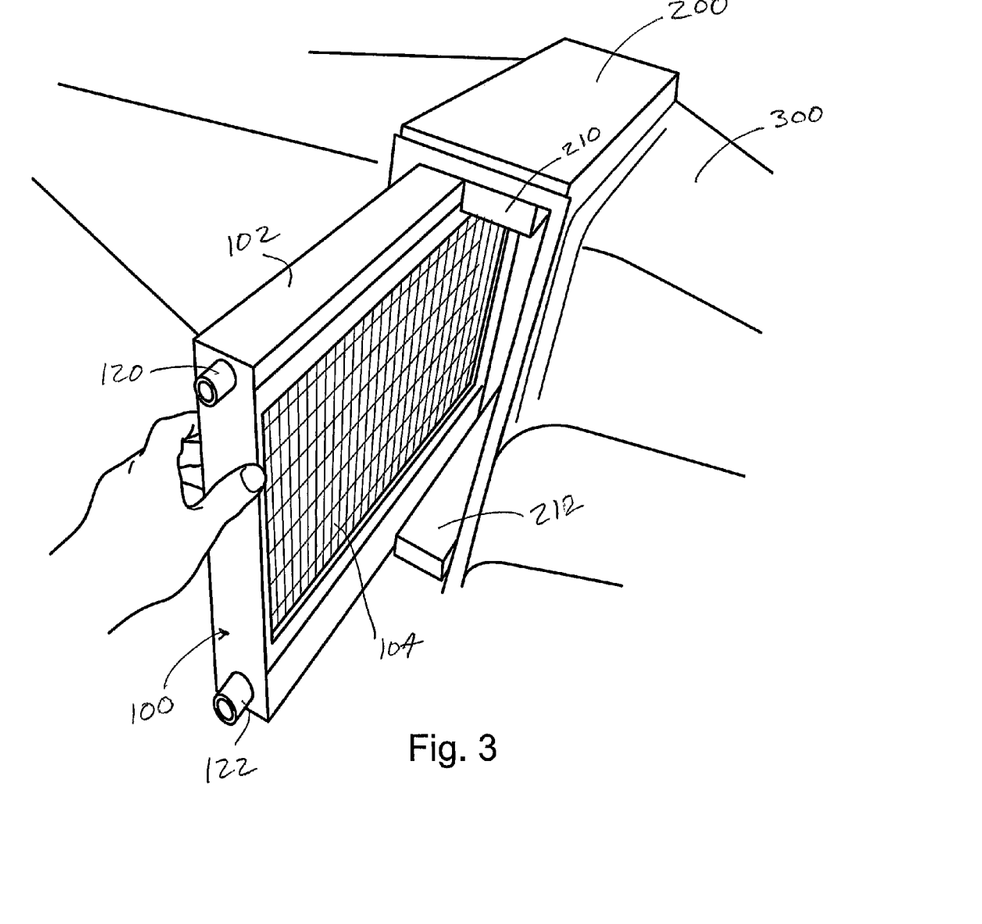
FIG. 3 is a schematic perspective side view illustration of the exemplary flat panel contactor of FIG. 1 being inserted into air handling duct work in accordance with at least one embodiment of the present invention.

It is contemplated that the hollow fiber array of FIGS. 1 to 3 may be replaced by a flat sheet membrane bundle.

In accordance with at least selected embodiments, the contactor includes two or more hollow fiber arrays or bundles in a single rectangular housing.

Although the possibly preferred present membrane contactors utilize a microporous membrane, the separation principle differs substantially from other membrane separations such as filtration and gas separation. With such preferred hollow fiber membrane contactors, there is no convective flow through the pores as occurs in other membrane separations. Instead, the preferred membrane acts as an inert support that brings the liquid and gas phases in direct contact without dispersion. The mass transfer between the two phases is governed entirely by the pressure of the gas phase. Because of the preferred Celgard® hollow fibers and the contactor geometry, the surface area per unit volume is an order of magnitude higher than traditional technologies. This high level of surface area to volume leads to a dramatic reduction in contactor/system size for a given level of performance.

The present possibly preferred membrane contactors may utilize one of two primary fiber types for absorption/stripping techniques for water. The Celgard® X-40 membrane has a thicker wall with a smaller inside diameter and is recommended for oxygen removal. The Celgard® X-50 membrane has a slightly thinner wall with a larger inside diameter. (see FIGS. 4 and 5) This feature allows for greater carbon dioxide removal as compared to the X-40 membrane.

Below is a comparison of the Celgard® X-40 and X-50 hollow fibers:

|  | Units | X-40 | X-50 |
| --- | --- | --- | --- |
| Fiber OD (nominal) | Microns | 300 | 300 |
| Fiber ID (nominal) | Microns | 200 | 220 |
| Bubble Point | psi | 240 | 240 |
| Load at Break | grams | 430 | 430 |
| Porosity | % | 25 | 40 |
| Average Pore Size | Microns | 0.03 | 0.04 |

A possible third fiber variant, a microporous polyolefin, was introduced for gas transfer of low surface tension fluids and the fluid always flows on the shell side in these devices. Additionally, an XIND fiber was introduced in larger industrial contactors, and is geared to non-FDA degassing applications.

A possible fourth fiber variant could have a separation layer that is selective to different gasses. One such example utilizes a silicone separation layer. In this example, the separation layer could be selective to water vapor over air (nitrogen, oxygen, and CO2).

Such fourth variant could be used, for example, when the panel contactor is used by or in a method including passing air to be treated through the contactor array on the shell side (outside of the hollow fibers) in a cross flow pattern at the same time a vacuum or sweep gas is passing through the lumen side (interior of the hollow fibers) of the contactor array. As such, the contactor is a shell-side gas/gas contactor.

When using the panel contactors as lumen side liquid membrane contactors, the liquid is introduced to the lumen side while the gas is introduced to the shell side.

When using the membrane contactors in gas absorption applications such as aeration or carbonation, etc., a gas is introduced, for example, into the inside (lumen side) of the hollow fiber membrane and the liquid phase is introduced to the outside (shell side) of the hollow fiber. The partial pressure of the gas and the water temperature controls the amount of gas dissolved in the liquid phase.

When using the membrane contactors in gas stripping applications such as decarbonation or deoxygenation, a vacuum or stripping gas or combination of those is applied to the lumen side of the hollow fibers. The liquid stream is introduced to the outside of the fiber. The partial pressure of the gas is decreased to remove dissolved gases from the liquid phase.

Referring to the drawings wherein like numerals indicate like elements, there is shown, in FIG. 1, one embodiment of a flat panel contactor 100 such as a rectangular hollow fiber array panel contactor including as major components a rectangular housing or frame 102, and a hollow fiber array 104. The housing 102 includes top 106, bottom 108, sides 110, 112, end caps 114, 116, and first fluid or lumen side ports (upper and lower side ports) 120, 122, with respective openings 124, 126.

The hollow fiber array 104 includes hollow fibers 130 and supporting threads or yarn 132. The ends of the fibers 130 are supported in rectangular potting in end members 134, 136. The interior of end caps 114, 116 and side ports 120, 122 define respective upper and lower lumen side head spaces or chambers that are in fluid communication with the open ends of the hollow fibers 130.

With reference to FIGS. 1 and 2, the sides 110 and 112 and the end members 134, 136 define there between first and second fluid or shell side ports 140, 142. These large, rectangular shell side fluid ports 140, 142 are in fluid communication with the respective exterior surfaces 144 and 146 of fiber array 104 and with the exteriors (or shells) of the hollow fibers 130.

In accordance with at least one embodiment, the contactor 100 is a lumen side liquid contactor, first fluid ports 120, 122 are liquid ports adapted to preferably receive liquid desiccant, and second fluid ports 140, 142 are gas ports adapted to preferably receive gas, such as air to be treated, to facilitate the heating, cooling, humidification, or dehumidification of the air.

Although it may be less preferred than the above embodiment, the contactor may be a shell side liquid contactor, first fluid ports 120, 122 are gas ports adapted to preferably receive one or more gasses, sweep gas, vacuum, or the like, and second fluid ports 140, 142 are liquid ports adapted to preferably receive liquid to be treated or modified (for example, to be degassed or gasified, to control, receive or remove carbon dioxide, nitrogen, and/or the like).

Although it may be yet less preferred than above, the first fluid ports 120, 122 are gas ports adapted to preferably receive one or more gasses, sweep gas, vacuum, or the like, and second fluid ports 140, 142 are also gas ports.

Although it may be still yet less preferred than above, first fluid ports 120, 122 are liquid ports adapted to preferably receive one or more liquids, and second fluid ports 140, 142 are also liquid ports.

For at least certain applications, the preferred arrangement may be a continuous flow or circulation of liquid in first fluid port 120 and out port 122 and a continuous flow or circulation of gas in second fluid port 140 and out port 142, a continuous flow or circulation of liquid in first fluid port 122 and out port 120 and a continuous flow or circulation of gas in second fluid port 142 and out port 140, a continuous flow or circulation of liquid in first fluid port 120 and out port 122 and a continuous flow or circulation of gas in second fluid port 142 and out port 140, a continuous flow or circulation of liquid in first fluid port 122 and out port 120 and a continuous flow or circulation of gas in second fluid port 140 and out port 142, or the like.

It is understood that the first fluid may be one or more liquids and/or gasses and that the second fluid may be one or more liquids and/or gasses.

Although not shown, cross braces or supports may be added between sides 110 and 112 to add support or strength to the frame 102 as needed. It is possibly preferred to minimize such obstructions to openings 140, 142 to maximize the flow through, to maximize the hollow fiber surface area available for transport, to reduce mass, to reduce cost, etc.

Many technologies or industries have the need to remove, add or control heat, cold, or humidity in or from gasses, to remove, add or control dissolved gasses in or from liquids, to remove, add or control a gas or material in or from a gas, to remove, add or control a liquid or solvent in or from a liquid, to remove, add or control a liquid or solvent in or from a gas, or the like. Panel contactor 100 and similar membrane contactors (alone or as multiple contactors in series and/or parallel arrangement) as shown and described herein can be used in such technologies or industries where such fluid, component or material needs to be removed, controlled or added. In other words, there are many membrane treatment, transfer, or other applications where the present devices could be used.

FIG. 1 shows exemplary panel contactor 100 to be a 4 port contactor having two side ports 120, 122 and two front and rear ports 140, 142. Additional ports may be added or ports may be removed depending on the application.

In accordance with a possibly most preferred embodiment, the housing or frame 102 has a rectangular shape, an outer dimension that matches with a standard furnace, AC or HVAC filter size, and is made of a non-metallic, corrosion resistant, material such as ABS.

Ports 120, 122 may be modified to include, for example, o-ring grooves for receiving respective o-rings which form fluid tight seals with couplings, pipes or conduits from the supply of the first fluid, to another contactor, or the like. Also, ports 120, 122 may be modified to extend from alternate sides or from the front or rear of the housing rather than both extending from one side thereof.

As described above, the preferred contactor 100 has a very simple yet very effective construction. Preferably, standard materials such as standard housing materials, ports, fibers, yarns, and potting are used together. Depending on the module end use or application, custom materials may need to be used.

Although the housing 102 may be a single piece, as shown in FIGS. 1 and 2, housing 102 is made up of pieces 110, 112, 114, and 116 joined, welded, or glued together.

Housing 102 and/or hollow fiber membrane array 104 may include one or more baffles or flow diverters.

With reference to FIG. 3, and in accordance with one possibly preferred example, the contactor 100 is being inserted into an HVAC filter receiver or housing 200 in HVAC ductwork 300. It is preferred that the contactor 100 be sized to fit in a standard air ventilation ductwork housing, receiver, return, diffuser, duct, etc. The housing 200 is adapted to receive two contactors 100 in side by side abutting relationship (to form a two contactor system) by removing spacers 210, 212.

In one example: the first fluid is a liquid and flows, for example, in port 120 via opening 124 into an upper head space in end cap 114, then into the upper open ends of the hollow fibers 130, down through the hollow fiber lumens and into bottom head space in end cap 116 and then out opening 126 in port 122; and the second fluid is a gas that flows under pressure, for example, in port 140, over the shells of the hollow fibers 130, and then out port 142.

In another example: the first fluid is a liquid and flows, for example, in port 120 via opening 124 into an upper head space in end cap 114, then into the upper open ends of the hollow fibers 130, down through the hollow fiber lumens and into bottom head space in end cap 116 and then out opening 126 in port 122; and the second fluid is a gas that flows under pressure, for example, in port 142, over the shells of the hollow fibers 130, and then out port 140.

In still another example: the first fluid is a liquid under pressure and flows, for example, in port 122 via opening 126 into lower head space in end cap 116, then into the lower open ends of the hollow fibers 130, up through the hollow fiber lumens and into upper head space in end cap 114 and then out opening 124 in port 120; and the second fluid is a gas that flows under pressure, for example, in port 140, over the shells of the hollow fibers 130, and then out port 142.

Although FIGS. 1 to 3 show a single contactor 100, it is contemplated that two or more contactors may be used.

With reference again to FIG. 3, it is noted that the contactors 100 are preferably self contained membrane contactors, of a reasonable size and weight to be shipped, handled, inserted, removed, and replaced. Such size and modularity to the contactors make the contactors and contactor systems easy to construct, to maintain, and the like.

With reference to one example, contactor 100 has a housing 102 with outer dimensions of an overall length of about 20 inches, an overall height of about 20 inches and an overall width, depth or thickness of about 2 inches and is formed of ABS polymer.

With reference to one example, contactor 100 has a hollow fiber array with outer dimensions of an overall length of about 19.5 inches, an overall height of about 18 inches and an overall width, depth or thickness of 1.5 inches and is formed of polyolefin fibers and yarns.

Figure 4:
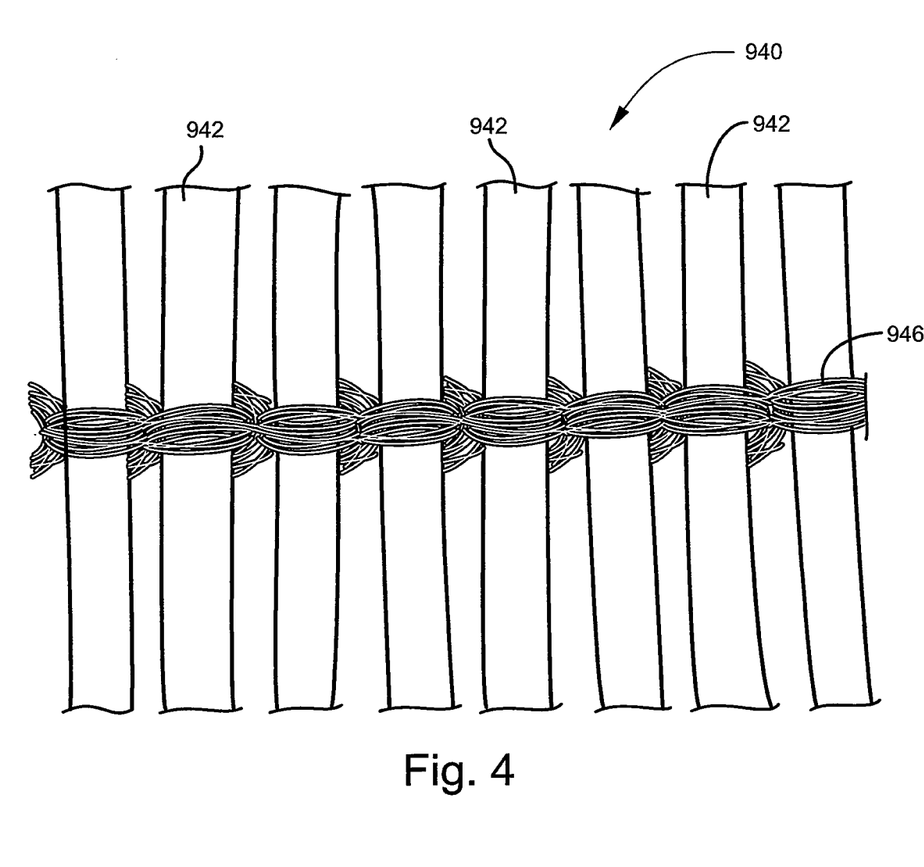
FIG. 4 is a schematic highly magnified surface view of an example of a portion of hollow fiber membrane array in accordance with at least one embodiment of the present invention.
Figure 5:
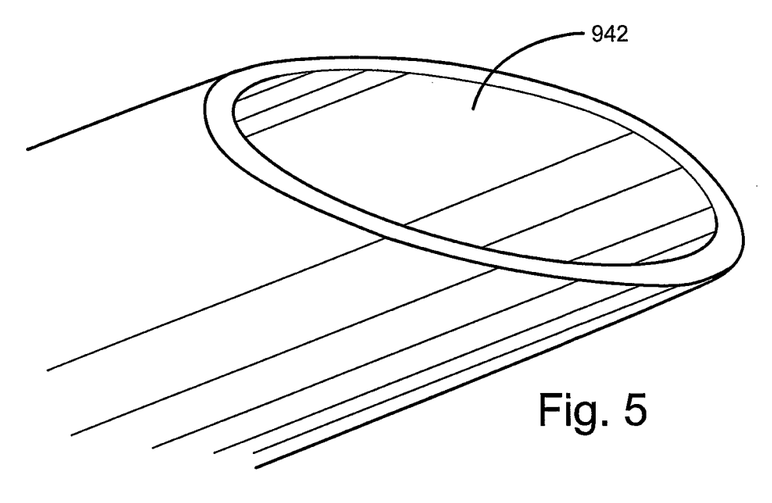
FIG. 5 is a schematic perspective end view of a hollow fiber membrane like one from FIG. 4 in accordance with at least one embodiment of the present invention; and, FIG. 6 is a schematic enlarged surface view of a portion of the exterior (shell side) of the hollow fiber of FIG. 5 in accordance with at least one embodiment of the present invention.
Figure 6:
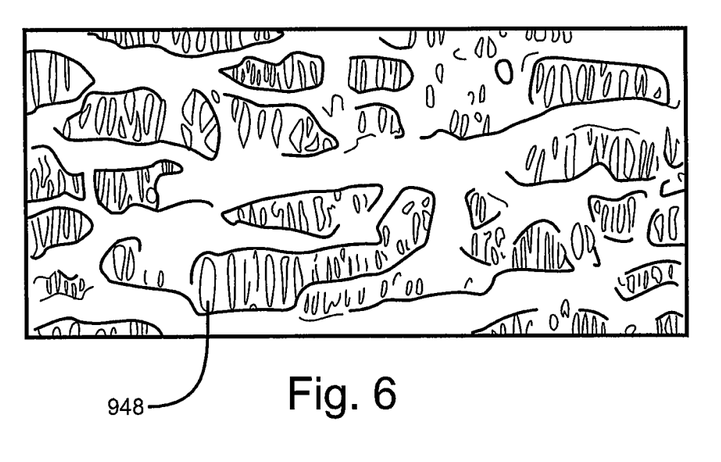

With reference to FIGS. 4 to 6, preferably, the hollow fibers are hydrophobic microporous membranes having pores which block the passage of liquid but allow passage or transfer of gases and vapors.

As schematically shown in FIG. 4, the preferred hollow fiber membrane array 940 includes a plurality of hollow fibers 942, for example, Celgard® X-40 hollow fibers, connected by cross threads 946 spaced along their length. Example hollow fibers may have an outer diameter of about 300 um.

In FIG. 5, one such hollow fiber 942 may have, for example, an outer diameter of about 300 um and an inner diameter of about 200 to 220 um.

As shown in FIG. 6, the preferred hollow fiber 942 has slit-like micro pores with, for example, an average pore size of 0.03 um. Such hollow fibers may be polypropylene and made by an environmentally friendly dry stretch process.

In contactor 100, it is preferred that hollow fiber membranes 130 each have a first end and a second end both being open, and potting at each end (in members 134, 136). The first and second membrane ends are open, for example, to allow fluid to pass there through. It may also be preferred that the potting be made of epoxy and that the ends of the potting be cut off to form the open first and second fiber ends following potting.

Benefits of using multiple contactors 100 rather than a larger single contactor include, for example, familiar equipment design, simple contactor replacement, shorter down time, more convenient storage/handling of contactors, more convenient storage/handling of replacement contactors, no specialized tools needed, lower replacement costs, and/or the like.

Some of the polymer components may be selected from, for example, polyvinyl chloride (PVC), chlorinated polyvinyl chloride (CPVC), high impact polystyrene (HIPS), polyacrylonitrile-butadiene-styrene (ABS), polyacrylate-styrene-acrlonitrile (ASA), and polycarbonate (PC).

According to at least one embodiment, the hollow fibers are embedded/potted in a resin by the gravity potting method.

According to at least one other embodiment, the hollow fibers are embedded/potted in a resin by the following method: A wound or folded hollow fiber array is introduced into a rectangular housing. In a first step, a fugitive or removable liquid or gel is introduced into one end of the housing via an opening while the housing is spinning around its central axis. As a result, the fugitive or removable liquid or gel forms a layer into which the ends of the hollow fibers are embedded. In a second step a liquid hardenable resin is introduced into the housing and by the centrifugal effect forms a resin layer over the first layer of the fugitive or removable liquid or gel, such that the hollow fibers are embedded in the resin layer in a segment along the fiber length nearby the fiber ends. After hardening of the resin, the fugitive or removable liquid or gel is removed and the hollow fibers are embedded in the hardened resin such that the fibers extend with their ends beyond the resin layer, then the fiber ends are trimmed. This process is repeated for the other end of the hollow fibers.

Potting or thermosetting materials include, but are not limited to, epoxy, thermoplastics, and polyurethane. Epoxies are preferred. Thermoplastics, as used herein, refers to a high polymer that softens when exposed to heat and returns to its original condition when cooled to room temperature; the term is usually applied to synthetics such as polyvinyl chloride, nylons, fluorocarbon polymers, linear polyethylene, polyurethane prepolymer, polystyrene, polypropylene, and cellulosic and acrylic resins. Exemplary thermoplastics include polyolefins, such as polypropylene and polyethylene.

Different potting methods may be employed to complete the potting step. Different potting methods, as described herein, include, but are not limited to, mold potting, centrifugal potting, and gravity potting.

Several factors may be important in the design of membrane contactors, including separation characteristics, cost, pressure drop, weight, and efficiency. The pressure drop across a contactor should preferably be low to reduce the need for more expensive high pressure equipment. Low pressure drop may be of particular importance in retrofit projects where a membrane contactor is to be added at the discharge point of an effluent process stream, as the process pressure at this point is typically at or near atmospheric pressure. High efficiency of mass transfer is desirable for reducing the size of the contactor. Low weight is desirable for decreasing installation and maintenance costs, and is of particular importance in offshore applications. At least certain existing membrane contactors have been found less than fully satisfactory in meeting these goals, for particular applications, for certain conditions, or the like. Accordingly, a need exists for an improved membrane contactor having improved characteristics over known membrane contactors, for use in particular applications, for use in certain conditions, and/or the like. It is to the provision of a microporous hollow fiber membrane device and/or method meeting these and/or other needs that at least selected embodiments of the present invention may be directed. It is to the provision of a microporous flat sheet membrane device and/or method meeting these and/or other needs that at least selected other embodiments of the present invention may be directed.

In accordance with at least certain embodiments of the present invention, it may be possible to dehumidify an air stream directly without the use of desiccants by pulling a deep vacuum on one side of a folded, pleated or wound (preferably spiral wound) hollow fiber and/or flat sheet membrane that is selective to water vapor over air. It may be preferred to use a flat panel contactor with such spiral wound hollow fiber and/or flat sheet membrane that is selective to water vapor. For example, air will flow on the exterior or shell side of the membrane and vacuum will be applied on the interior or lumen side. Silicone (or silicone treated or coated) membrane is one such membrane that will perform this function.

In at least certain selected embodiments, the present invention is directed to porous membrane (flat sheet and/or hollow fiber) contactors and/or their methods of manufacture and/or use. In at least certain selected embodiments, the present invention is directed to flat panel porous membrane contactors and/or their methods of manufacture and/or use. In at least certain particular embodiments, the present invention is directed to flat sheet microporous membrane (or film) flat panel contactors, contactor systems, and/or their methods of manufacture and/or use. For example, the flat sheet membrane may be folded, pleated, wound, spiral wound, and/or the like.

In at least particular possibly preferred embodiments, a rectangular flat panel contactor is adapted for placement in an air duct (such as an HVAC duct) and has a rectangular frame or housing enclosing at least one wound (for example, elongated oval or rectangle) or pleated or folded (for example, accordion folded) flat sheet membrane, potting affixing each open end of the membrane, large interior side fluid openings in communication with the membrane interior surfaces, and interior side fluid head spaces in communication with the open ends and interior surfaces of the membrane. The number of windings or layers of porous flat sheet membrane determines the depth of the panel. The end result is a folded, pleated and/or wound membrane with X height, Y width, and Z depth. The membrane may be potted directly into a square or rectangular frame, similar in shape to an HVAC air filter. In at least one embodiment, air to be treated would pass through the contactor membrane on the exterior side (outside of the membrane) in a cross flow pattern with liquid (hot, cold, humidifying, or absorbent liquid), strip gas, or vacuum passing through the interior side (interior of the wound membrane) of the contactor. The outer free end of the flat sheet membrane may be sealed to the abutting membrane layer or fold to separate the outer and interior fluid chambers by any conventional means such as by welding, potting, adhesive, or the like (using a bead of potting material may be preferred).

In at least selected embodiments, the present invention is directed to an improved device for heating, cooling, humidifying, and/or dehumidifying air passing through or being treated by a liquid-desiccant, an HVAC and/or an ERV system. In at least one embodiment, hot humid air to be treated would pass through the panel contactor membrane on the outer or shell side in a cross flow pattern with liquid (cold and/or absorbent liquid, a salt solution, or desiccant) passing through the interior or lumen side of the panel contactor membrane. In at least one other embodiment, cold dry air to be treated would pass through the panel contactor on the outer or shell side in a cross flow pattern with liquid (hot and/or humidifying liquid, a salt solution, or desiccant) passing through the interior or lumen side of the panel contactor. In at least one other embodiment, humid air to be treated would pass through the panel contactor on the outer or shell side in a cross flow pattern. A membrane with a separation layer preferably selective to water vapor over air (nitrogen, $CO_2$, and oxygen) may be used. A vacuum may be applied to the interior or lumen side of the membrane to create a driving force to draw the water vapor into the interior or lumen side of the membrane.

In at least certain embodiments, the present invention is directed to methods of producing or manufacturing flat panel flat sheet membrane contactors. In at least one embodiment, the panel contactor is produced by a method including winding a porous membrane or film around a paddle to form a square or rectangular format membrane bundle. The number of windings or layers determines the depth or thickness of the panel. The end result is a wound membrane with X height, Y width, and Z depth. Then, the wound membrane is removed from the paddle and potted directly into a square or rectangular frame, similar in shape to an HVAC air filter. If needed, the ends of the membrane bundle are opened and interior or lumen side fluid head spaces are formed or added at each end. Such a panel contactor is adapted to have air pass through the membrane on the exterior, outer or shell side (outside of membrane bundle) in a cross flow pattern with liquid (hot, cold, humidifying, and/or absorbent liquid) or gas passing through or vacuum applied to the interior or lumen side (interior of the membrane bundle) of the panel contactor.

In at least one other embodiment, the panel contactor is produced by a method including pleating or folding (for example, z folded, accordion folded, or pleated, and then optionally wound) a flat sheet porous membrane or film to form a square or rectangular format membrane bundle. The number of folds or layers may determine the depth of the panel. The end result is a membrane bundle with X height, Y width, and Z depth. Then, the folded or pleated bundle is potted directly into a square or rectangular frame, similar in shape to an HVAC air filter. If needed, the ends of the membrane bundle are opened and interior or lumen side fluid head spaces are formed or added at each end. Such a panel contactor is adapted to have air pass through the bundle on the exterior or shell side (outside of membrane bundle) in a cross flow pattern with liquid (hot, cold, humidifying, and/or absorbent liquid) or gas passing through or vacuum applied to the interior or lumen side (interior of the bundle) of the contactor.

In at least certain embodiments, the present invention is directed to methods of using or uses of flat panel contactors. In at least one embodiment, the panel contactor is used by a method including passing air to be treated through the contactor membrane or array in a cross flow pattern at the same time that liquid (hot, cold, humidifying, and/or absorbent liquid) or gas is passing through or vacuum is applied to the interior or lumen side of the contactor bundle or array.

Other uses of the inventive panel contactor may include:
$CO_2$ scrubbing,
Greenhouse gas scrubbing,
$SO_x$ scrubbing,
$NO_x$ scrubbing,
HCL scrubbing,
Ammonia scrubbing,
Humidification of gas,
Dehumidification of gas,
Liquid desiccant absorption of moisture and latent heat for energy recovery in HVAC systems,
Air emission control (of noxious odors—such as at pig or hog farms), and/or
Gas temperature control by varying the humidity level (such as in evaporative cooling or in a swamp cooler).

The present invention may be embodied in other forms without departing from the spirit and the essential attributes thereof, and, accordingly, reference should be made to the appended claims, rather than to the foregoing specification, as indicated in the scope of the invention.

The invention claimed is:

1. A flat panel contactor for an air handling, ventilation or duct system comprising:
   a frame having a top member, a bottom member, and two side members, the members defining an open front port and an open back port, the frame has at least two side ports extending from one side member;
   a first headspace adjacent the top member;
   a second headspace adjacent the bottom member;
   a hollow fiber membrane array located between the top and bottom members, between the side members, and between the front port and the back port, the array has multiple layers of hollow fibers, each layer has between 10-58 fibers per inch, the hollow fibers are held together with a supporting thread, the hollow fibers have a plurality of pores with an average pore size of 0.03-0.04 microns, and lumens of the hollow fiber are in fluid communication with the headspaces;
   wherein the array has a gas pressure drop less than 0.5 psi per 1000 SCFM.

2. The flat panel contactor of claim 1, wherein the hollow fiber array is pleated or folded.

3. A contactor system comprising two or more of said contactors of claim 1.

4. The flat panel contactor of claim 1, wherein the hollow fiber membranes are selective to water vapor over air.

* * * * *